US006829952B2

(12) United States Patent
Stanley et al.

(10) Patent No.: US 6,829,952 B2
(45) Date of Patent: Dec. 14, 2004

(54) SEAT BELT TENSION SENSOR (75) Inventors: James G. Stanley, Novi, MI (US);
David S. Wilson, Clarkston, MI (US);
Ryan N. Steele, Dearborn, MI (US);
Donald A. Duda, Novi, MI (US);
Judson G. McDonnell, Howell, MI (US)

(73) Assignee: Automotive Systems Laboratory, Inc., Farmington Hills, MI (US)

( * ) Notice: Subject to any disclaimer, the term of this patent is extended or adjusted under 35 U.S.C. 154(b) by 0 days.

(21) Appl. No.: 10/248,728

(22) Filed: Feb. 12, 2003

(65) Prior Publication Data

US 2003/0150283 A1 Aug. 14, 2003

Related U.S. Application Data (60) Provisional application No. 60/356,793, filed on Feb. 13, 2002.

(51) Int. Cl.[7] .................................................. G01L 1/26
(52) U.S. Cl. .................................................. 73/862.391
(58) Field of Search ........................ 73/862.391, 862.42, 73/862.451, 862.393, 862.69, 862.392, 862.471

(56) References Cited

U.S. PATENT DOCUMENTS

| | | | |
|---|---|---|---|
| 1,650,603 A | 11/1927 | Burton | 73/862.454 |
| 2,343,229 A | 2/1944 | Stone et al. | 265/1.6 |
| 2,434,138 A | 1/1948 | Adams | 177/48 |
| 2,452,302 A | 10/1948 | Hitchen | 73/862.471 |
| 2,604,782 A | 7/1952 | Rissler et al. | 73/143 |
| 2,659,574 A | 11/1953 | Crookston | 254/173 |
| 2,752,558 A | 8/1956 | Kane | 323/64 |
| 2,925,731 A | 2/1960 | Cammack | 73/144 |
| 3,149,488 A | 9/1964 | Castro | 73/141 |
| 3,203,672 A | 8/1965 | Santos | 254/173 |

(List continued on next page.)

FOREIGN PATENT DOCUMENTS

DE  4039121 A1  6/1991 .......... B65H/63/04

OTHER PUBLICATIONS

Electronics Express, vol. 9, No. 7, 1967, p. 68.
Netzer, Y., "A Very Linear Noncontact Displacement Measurement with a Hall–Element Magnetic Sensor," Proceedings of the IEEE, vol. 69, No. 4, Apr. 1981, New York, pp. 491–492.
Heremans, J.P., "Magnetic Field Sensors for Magnetic Position Sensing in Automotive Applications," General Motors Corporation, Research and Development Center, Apr. 1, 1997, Michigan.
Ramsden, E., *Hall Effect Sensors: Theory & Application*, Advanstar Communications Inc., 2001, pp. 103–105.

*Primary Examiner*—Max Noori
(74) *Attorney, Agent, or Firm*—Dinnin & Dunn P.C.

(57) ABSTRACT

An anchor plate operatively coupled to a seat belt incorporates a slot that slideably engages an anchor bolt, which is biased therein by a spring. A tension in the seat belt causes a deflection of the spring and an associated motion of the anchor bolt in the slot, which is sensed by a proximity sensor on the anchor plate. In another aspect, a carriage is adapted to slide relative to a bracket, and a first spring is operative between the carriage and the bracket so as to bias the carriage relative to the bracket in a direction opposite to a first direction. Either the bracket is operatively coupled to a vehicle frame with an anchor bolt and the seat belt operatively engages the carriage, or vice versa. A tension in the seat belt, when reacted by the anchor bolt, causes an associated motion of the carriage in the first direction, which is sensed by a displacement sensor. In one embodiment, a second spring is operative between the carriage and the bracket so as to bias the carriage in the first direction relative to said bracket, thereby substantially eliminating slack. One embodiment of the displacement sensor comprises a magnetic sensor coupled to the bracket, which measures the magnetic field between a pair of magnets having crossed pole orientations, operatively coupled to the carriage. In another aspect, a second carriage and associated displacement sensor provide an additional measure of tension.

27 Claims, 6 Drawing Sheets

U.S. PATENT DOCUMENTS

| | | | |
|---|---|---|---|
| 3,362,585 A | 1/1968 | Nessim et al. | 222/55 |
| 3,366,298 A | 1/1968 | Bahrani | 226/1 |
| 3,376,740 A | 4/1968 | Harvey | 73/144 |
| 3,426,589 A | 2/1969 | Brendel | 73/862.471 |
| 3,433,064 A | 3/1969 | Jacobson | 73/862.382 |
| 3,444,731 A | 5/1969 | Nieuweboer | 73/144 |
| 3,462,731 A | 8/1969 | Gray | 340/457.1 |
| 3,602,866 A | 8/1971 | Saxl | 338/5 |
| 3,610,342 A | 10/1971 | Stainken | 177/147 |
| 3,618,378 A | 11/1971 | Shull et al. | 73/144 |
| 3,675,482 A | 7/1972 | Hewitt | 73/144 |
| 3,720,100 A | 3/1973 | Grunbaum | 73/144 |
| 3,784,972 A | 1/1974 | Hults | 340/52 E |
| 3,817,093 A | 6/1974 | Williams | 73/144 |
| 3,834,225 A | 9/1974 | Burchett | 73/144 |
| 3,943,761 A | 3/1976 | Shoberg et al. | 73/144 |
| 4,126,919 A | 11/1978 | Lassche | 24/230 A |
| 4,130,014 A | 12/1978 | Eddens | 73/144 |
| 4,141,245 A | 2/1979 | Brandstetter | 73/144 |
| 4,222,551 A | 9/1980 | Simon | 177/132 |
| 4,315,214 A | 2/1982 | Kataoka | 324/208 |
| 4,326,424 A | 4/1982 | Koenig | 73/862.48 |
| 4,397,180 A | 8/1983 | Wolff et al. | 73/119 A |
| 4,437,352 A | 3/1984 | Deborde et al. | 73/862.47 |
| 4,530,245 A | 7/1985 | Jacobson | 73/768 |
| 4,587,855 A | 5/1986 | Yamada et al. | 73/862.48 |
| 4,597,297 A | 7/1986 | Smith | 73/862.48 |
| 4,677,861 A | 7/1987 | Bartholomew | 73/862.54 |
| 4,721,269 A * | 1/1988 | Gulette et al. | 242/385.2 |
| 4,759,226 A | 7/1988 | Leurer | 73/862.48 |
| 4,805,467 A | 2/1989 | Bartholomew | 73/862.54 |
| 4,846,000 A | 7/1989 | Steinseifer | 73/862.47 |
| 4,943,087 A | 7/1990 | Sasaki | 280/804 |
| 4,979,400 A | 12/1990 | Bartholomew | 73/862.54 |
| 5,019,017 A | 5/1991 | Monch | 474/102 |
| 5,060,977 A | 10/1991 | Saito | 280/802 |
| 5,115,186 A | 5/1992 | Reinartz et al. | 324/207.22 |
| 5,129,485 A | 7/1992 | Hoch | 187/20 |
| 5,133,425 A | 7/1992 | Han | 180/270 |
| 5,149,922 A | 9/1992 | Kondou | 187/131 |
| 5,157,966 A | 10/1992 | Lugosi et al. | 73/118.1 |
| 5,181,739 A | 1/1993 | Bauer et al. | 280/807 |
| 5,287,756 A | 2/1994 | Tassic | 73/862.391 |
| 5,313,345 A | 5/1994 | Schandl et al. | 360/74.1 |
| 5,329,822 A | 7/1994 | Hartel et al. | 73/862.61 |
| 5,332,262 A | 7/1994 | Chou | 280/806 |
| 5,365,791 A | 11/1994 | Padula et al. | 73/745 |
| 5,365,797 A | 11/1994 | McCrory, III | 73/862.44 |
| 5,511,820 A | 4/1996 | Hatfield | 280/733 |
| 5,522,619 A * | 6/1996 | Collins | 280/806 |
| 5,591,944 A | 1/1997 | Meyer | 177/229 |
| 5,606,206 A | 2/1997 | Stephany et al. | 310/13 |
| 5,608,317 A | 3/1997 | Hollmann | 324/207.2 |
| 5,615,917 A | 4/1997 | Bauer | 280/806 |
| 5,629,487 A | 5/1997 | Mucke et al. | 73/818 |
| 5,636,864 A | 6/1997 | Hori | 260/735 |
| 5,650,704 A | 7/1997 | Pratt | 318/623 |
| 5,712,561 A | 1/1998 | McCurley et al. | 324/207.2 |
| 5,714,693 A | 2/1998 | Sturm | 73/862.454 |
| 5,718,451 A | 2/1998 | White | 280/735 |
| 5,732,974 A | 3/1998 | Sayles | 280/805 |
| 5,905,210 A | 5/1999 | O'Boyle et al. | 73/862.331 |
| 5,944,135 A | 8/1999 | Blackburn et al. | 180/268 |
| 5,959,220 A | 9/1999 | Jun | 73/862.391 |
| 5,960,523 A | 10/1999 | Husby et al. | 24/633 |
| 5,965,827 A | 10/1999 | Stanley et al. | 73/862.391 |
| 5,996,421 A | 12/1999 | Husby | 73/862.451 |
| 6,026,694 A | 2/2000 | Gray | 73/862.68 |
| 6,057,682 A | 5/2000 | McCurley et al. | 324/207.23 |
| 6,081,759 A | 6/2000 | Husby et al. | 701/45 |
| 6,122,978 A | 9/2000 | Callendrier | 73/862.474 |
| 6,205,868 B1 | 3/2001 | Miller | 73/862.391 |
| 6,209,915 B1 | 4/2001 | Blakesley | 280/801.1 |
| 6,230,088 B1 | 5/2001 | Husby | 701/45 |
| 6,259,042 B1 | 7/2001 | David | 177/136 |
| 6,260,879 B1 | 7/2001 | Stanley | 280/735 |
| 6,264,236 B1 | 7/2001 | Aoki | 280/735 |
| 6,301,977 B1 | 10/2001 | Stojanovski | 73/862.393 |
| 6,304,078 B1 | 10/2001 | Jarrard et al. | 324/207.2 |
| 6,311,571 B1 | 11/2001 | Norton | 73/862.637 |
| 6,336,371 B1 | 1/2002 | O'Boyle | 73/885.9 |
| 6,351,116 B1 | 2/2002 | Bolda et al. | 324/202 |
| 6,356,200 B1 | 3/2002 | Hamada et al. | 340/667 |
| 6,363,793 B2 | 4/2002 | O'Boyle | 73/828 |
| 6,364,352 B1 | 4/2002 | Norton | 280/735 |
| 6,400,145 B1 | 6/2002 | Chamings et al. | 324/207.26 |
| 6,405,607 B2 | 6/2002 | Faigle et al. | 73/862.391 |
| 6,450,534 B1 | 9/2002 | Blakesley et al. | 280/801.1 |
| 6,454,304 B1 | 9/2002 | Steffens, Jr. | 280/801.1 |
| 6,481,750 B1 | 11/2002 | Kalina et al. | 280/801.1 |
| 6,502,860 B1 | 1/2003 | Siegfried et al. | 280/801.1 |
| 6,508,114 B2 * | 1/2003 | Lawson | 73/159 |
| 6,520,032 B2 | 2/2003 | Resh et al. | 73/862.472 |
| 6,520,540 B1 | 2/2003 | Siegfried et al. | 280/801.1 |
| 6,554,318 B2 * | 4/2003 | Kohut et al. | 280/801.1 |
| 6,566,869 B2 | 5/2003 | Chamings et al. | 324/207.26 |
| 6,578,432 B2 * | 6/2003 | Blakesley et al. | 73/826 |
| 6,586,929 B1 | 7/2003 | Luetwzow | 324/207.24 |
| 6,605,877 B1 | 8/2003 | Patterson et al. | 307/10.1 |
| 2001/0042981 A1 | 11/2001 | Kohut et al. | 280/801.1 |
| 2001/0054323 A1 | 12/2001 | Faigle et al. | 73/862.391 |
| 2002/0024205 A1 | 2/2002 | Curtis et al. | 280/733 |
| 2002/0035878 A1 | 3/2002 | Norton | 73/862.391 |
| 2002/0056975 A1 | 5/2002 | Yoon et al. | 280/735 |
| 2002/0062688 A1 | 5/2002 | Lawson | 73/159 |
| 2002/0134590 A1 | 9/2002 | Wolfe et al. | 177/144 |
| 2002/0139196 A1 | 10/2002 | Resh et al. | 73/827 |
| 2002/0145422 A1 | 10/2002 | Chamings et al. | 324/207.26 |
| 2002/0171234 A1 | 11/2002 | Stephen et al. | 280/735 |
| 2002/0189365 A1 | 12/2002 | Blakesley et al. | 73/826 |
| 2003/0024326 A1 | 2/2003 | Blakesley et al. | 73/862.391 |
| 2003/0024327 A1 | 2/2003 | Garver et al. | 73/862.393 |
| 2003/0033885 A1 | 2/2003 | Knox et al. | 73/777 |
| 2003/0060997 A1 | 3/2003 | Ilyes | 702/127 |
| 2003/0070846 A1 | 4/2003 | Wolfe et al. | 177/144 |
| 2003/0089544 A1 | 5/2003 | Greib et al. | 180/268 |
| 2003/0111835 A1 | 6/2003 | Sullivan et al. | 280/801.1 |
| 2003/0122361 A1 | 7/2003 | Kaltenbacher, II et al. | 280/801.1 |
| 2003/0155166 A1 | 8/2003 | Sullivan et al. | 180/288 |
| 2003/0158643 A1 | 8/2003 | Murphy et al. | 701/45 |
| 2003/0172748 A1 | 9/2003 | Specht | 73/862.391 |
| 2003/0209088 A1 | 11/2003 | Sullivan et al. | 73/862.391 |

* cited by examiner

SEAT BELT TENSION SENSOR

CROSS REFERENCE TO RELATED APPLICATIONS

The instant application claims the benefit of prior U.S. Provisional Application Ser. No. 60/356,793 filed on Feb. 13, 2002, which is incorporated herein by reference.

BRIEF DESCRIPTION OF DRAWINGS

In the accompanying drawings:

FIG. 14b illustrates an axis system associated with FIG. 14a;

FIG. 15 illustrates a characterization of the magnetic field sensor illustrated in FIG. 14a.

DETAILED DESCRIPTION

There exists a need for measuring a tensile load in a flexible load bearing element, such as a webbing, cable, rope or thread. As an example, there exists a need to measure a tensile load in a seat belt used in vehicular safety restraint system, wherein the seat belt load measurement can be used to distinguish a type of object secured by the seat belt, or can be used to compensate for the affect of seat belt loads upon a measurement of seat weight from a seat weight sensor in the seat base.

Figure 1:
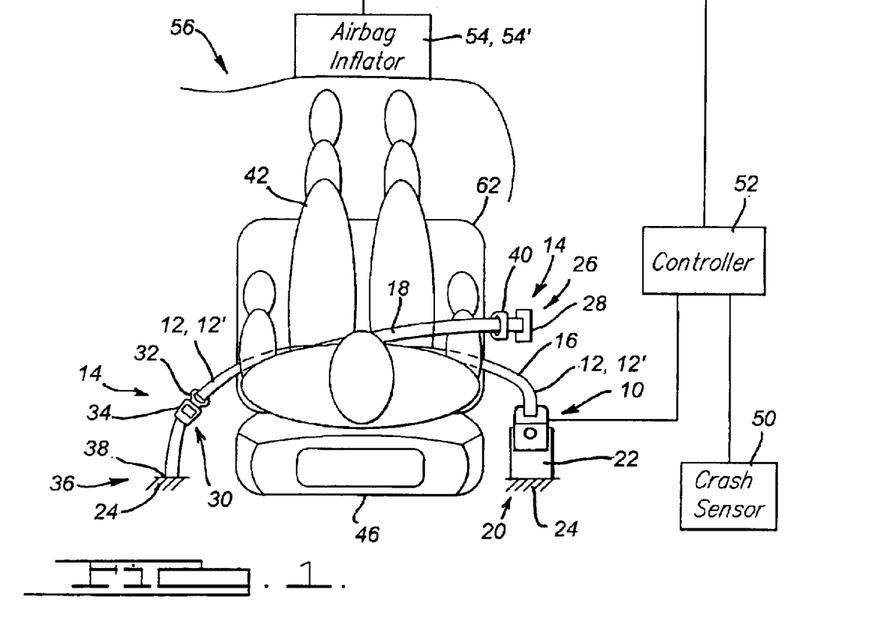
FIG. 1 illustrates a top-view of an occupant in a vehicle seat wearing a seat belt, wherein the seat belt is operatively coupled to a seat belt tension sensor.

Referring to FIG. 1, a seat belt tension sensor 10 is operatively coupled to a webbing 12 of a seat belt 14, for measuring a tensile load therein.

The seat belt 14 illustrated in FIG. 1 generally known as a "three-point" seat belt with a continuous loop lap/shoulder belt—comprises a lap belt portion 16 and a shoulder belt portion 18, wherein one end of the lap belt portion 16 the seat belt 14 is attached at a "first point" 20 to a first anchor 22 secured to the vehicle frame 24, one end of the shoulder belt portion 18 is attached at a "second point" 26 to a seat belt retractor 28 secured to the vehicle frame 24, and the other ends of the lap belt portion 16 the shoulder belt portion 18 are located where the seat belt 14 passes through a loop 30 in a latch plate 32 that engages with a buckle 34 that is attached at a "third point" 36 to a second anchor 38 secured to the vehicle frame 24. The shoulder belt portion 18 passes through a "D-ring" 40 operatively connected to the vehicle frame 24 that guides the shoulder belt portion 18 over a shoulder of the occupant 42.

The seat belt retractor 28 has a spool that either provides or retracts webbing 12 as necessary to enable the seat belt 14 to placed around the occupant 42 sufficient to engage the latch plate 32 with the buckle 34, and to remove excess slack from the webbing 12. The seat belt retractor 28 provides a nominal tension in the seat belt 14 so that, responsive to a crash that causes the seat belt retractor 28 to lock the webbing 12 thereby preventing further withdrawal, the occupant 42 is restrained by the seat belt 14 relatively earlier in the crash event than would occur had there been slack in the seat belt 14. During the crash event, when restraining the occupant 42, the webbing 12 of the seat belt 14 can be exposed to a relatively high tensile load, the magnitude of which depends upon the severity of the crash and the mass of the occupant 42.

Figure 2:
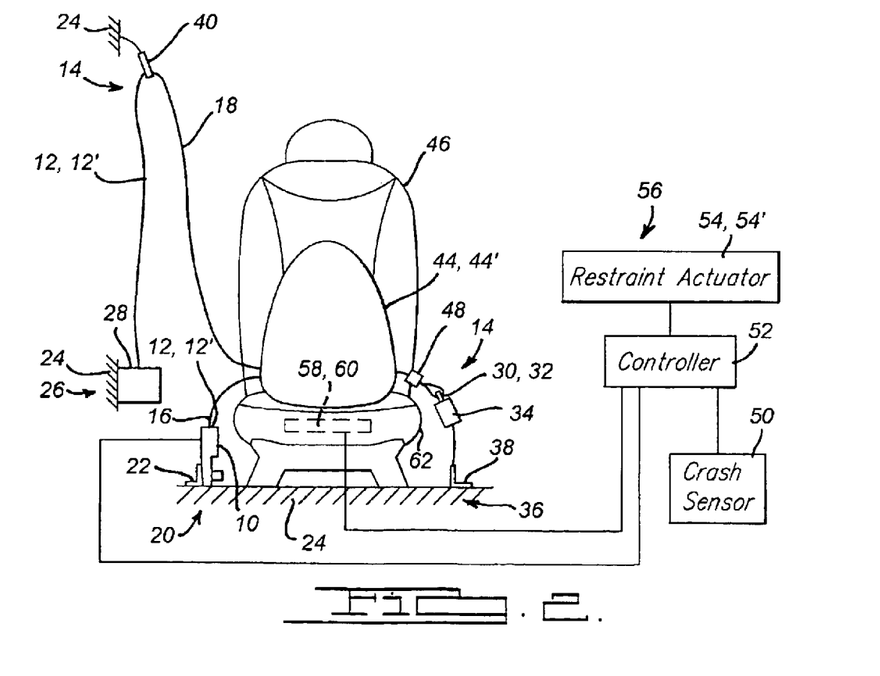
FIG. 2 illustrates a front-view of a vehicle seat upon which a child seat is secured by a seat belt, wherein the seat belt is operatively coupled a seat belt tension sensor and the vehicle seat incorporates a seat weight sensor.

Referring to FIG. 2, the lap belt portion 16 of a seat belt 14 may also be used to secure a child seat 44, such as a rear facing infant seat 44", to the vehicle seat 46, wherein a locking clip 48 may be used to prevent the shoulder belt portion 18 from sliding relative to the lap belt portion 16 proximate to the latch plate 32. In this case, the lap belt portion 16 is typically secured relatively tight with an associated tensile load greater than the associated comfort limit for an adult so as to hold the child seat 44 firmly in the vehicle seat 46 by compressing the seat cushion thereof, and the shoulder belt portion 18 is not otherwise relied upon for restraint.

Accordingly, the tensile load in the webbing 12 of the seat belt 14 can be used to discriminate an object on the vehicle seat 46, wherein a tensile load greater than a threshold would be indicative of a child seat 44. Referring to FIGS. 1 and 2, a seat belt tension sensor 10 is operatively coupled to a lap belt portion 16 of a webbing 12 of a seat belt 14 at a particular seating location. The seat belt tension sensor 10 and a crash sensor 50 are operatively coupled to a controller 52 that is adapted to control the actuation of a restraint actuator 54 e.g., an air bag inflator 54"—of a safety restraint system 56 located so as to protect an occupant at the particular seating location. If the tensile load sensed by the seat belt tension sensor 10 is greater than a threshold, then the restraint actuator 54 is disabled by the controller 52 regardless of whether or not a crash is detected by the crash sensor 50. If the tensile load sensed by the seat belt tension sensor 10 is less than a threshold, then the restraint actuator 54 is enabled by the controller 52 so that the restraint actuator 54 can be actuated responsive to a crash detected by the crash sensor 50. Alternately, for a controllable restraint actuator 54, e.g. a multi-stage airbag inflator 54", the timing and number of inflator stages inflated can be controlled to effect a reduced inflation rate rather than disabling the air bag inflator 54" responsive to the seat belt tension sensor 10 sensing a tensile load greater than a threshold.

Referring to FIG. 2, a seat belt tension sensor 10 may be used in conjunction with at least one other occupant sensor 58, e.g. a seat weight sensor 60, to control the actuation of a safety restraint system 56. The seat weight sensor 60 may operate in accordance with any of a variety of known technologies or embodiments, e.g. incorporating a hydrostatic load sensor, a force sensitive resistor, a magnetostrictive sensing elements, or a strain gage load sensor, which, for example, either measure at least a portion of the load within the seat cushion 62, or measure the total weight of the seat. In either case, a tensile load in the seat belt 14 that is reacted by the vehicle frame 24 acts to increase the load upon the seat cushion 62, thereby increasing the apparent load sensed by the seat weight sensor 60. The apparent load is increased by each reaction force, so that a given tensile load in the seat belt 14 could increase the apparent load sensed by the seat weight sensor 60 by as much as twice the magnitude of the tensile load. Accordingly, in a system with both a seat belt tension sensor 10 and a seat weight sensor 60, the seat weight measurement from the seat weight sensor 60 can be compensated for the effect of tensile load in the seat belt 14 so as to provide a more accurate measure of occupant weight, by subtracting, from the seat weight measurement, a component of seat weight caused by, or estimated to have been caused by, the tensile load measured by the seat belt tension sensor 10. If the seat weight measurement from the seat weight sensor 60 is not compensated for the effect of the tensile load in the seat belt 14, a child seat 44 secured to a vehicle seat 46 with a seat belt 14 could cause a load on the seat weight sensor 60 that is sufficiently high to approximate that of an adult, so that an uncompensated seat weight measurement might cause the associated restraint actuator 54 to be erroneously enabled in a system for which the restraint actuator 54 should be disabled when a child seat 44 is on the vehicle seat 46.

In a system that compensates for the affect of seat belt tension on an occupant sensor 58, the seat belt tension sensor 10, the occupant sensor 58,—e.g. a seat weight sensor 60,—and a crash sensor 50 are operatively coupled to a controller 52 that is adapted to control the actuation of a restraint actuator 54 e.g., an air bag inflator 54"—of a safety restraint system 56 located so as to protect an occupant at the particular seating location. If the tensile load sensed by the seat belt tension sensor 10 is greater than a threshold, then the restraint actuator 54 is disabled by the controller 52 regardless of whether or not a crash is detected by the crash sensor 50 or regardless of the measurement from the occupant sensor 58. If the tensile load sensed by the seat belt tension sensor 10 is less than a threshold, then the restraint actuator 54 is enabled or disabled by the controller 52 responsive to a measurement from the occupant sensor 58, which may be compensated responsive to the tensile load sensed by the seat belt tension sensor 10. If the restraint actuator 54 is enabled, then the restraint actuator 54 can be actuated responsive to a crash detected by the crash sensor 50. Alternately, for a controllable restraint actuator 54, e.g. a multi-stage airbag inflator 54", the timing and number of inflator stages inflated can be controlled to effect a reduced inflation rate rather than disabling the air bag inflator 54" responsive to measurements from the occupant sensor 58 and the seat belt tension sensor 10.

Figure 3:
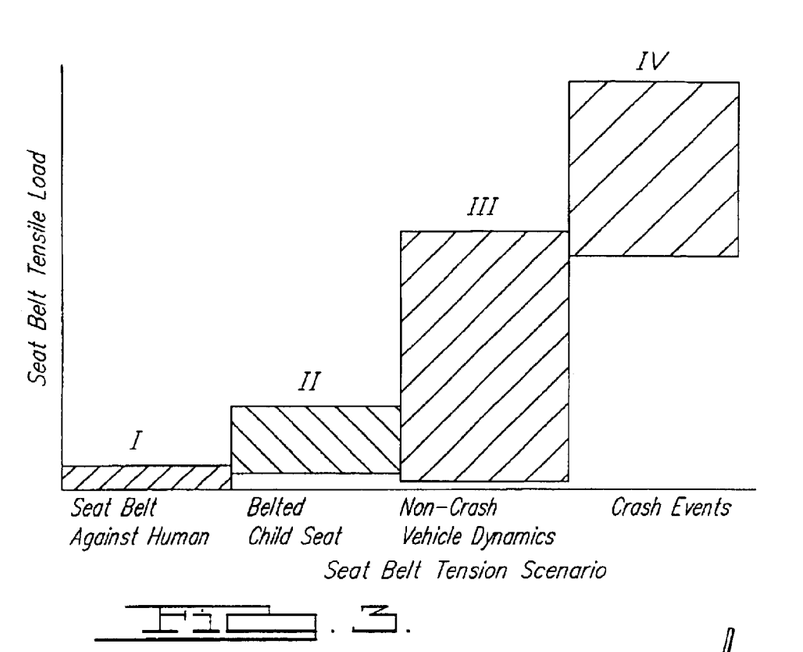
FIG. 3 illustrates scenarios associated with various seat belt tensile load ranges.

Referring to FIG. 3, the loads to which a seat belt 14 is normally exposed can be classified into four ranges as follows: 1) a low range (I) comprising tensile loads associated with the seat belt 14 being placed directly around a human, 2) a low-intermediate range (II) comprising tensile loads associated with the restraint a child seat 44, 3) a high-intermediate range (III) comprising loads associated with non-crash vehicle dynamics, e.g. braking or rough roads, and 4) a high range (IV) comprising tensile loads associated with restraint forces of a crash event. The low range (I), for example, would normally be limited by the maximum tensile load that an occupant 42 could comfortably withstand. The low-intermediate range (II), for example, would normally be limited by the maximum tensile load that a person could apply to the seat belt 14 while securing a child seat 44 to the vehicle seat 46. Notwithstanding that the seat belt 14 and associated load bearing components can be subject to the high range (IV) tensile loads, a seat belt tension sensor 10 would be useful for controlling a safety restraint system 56 if it were capable of measuring low-intermediate range (II) tensile loads associated with securing a child seat 44 to a vehicle seat 46.

Figure 4:
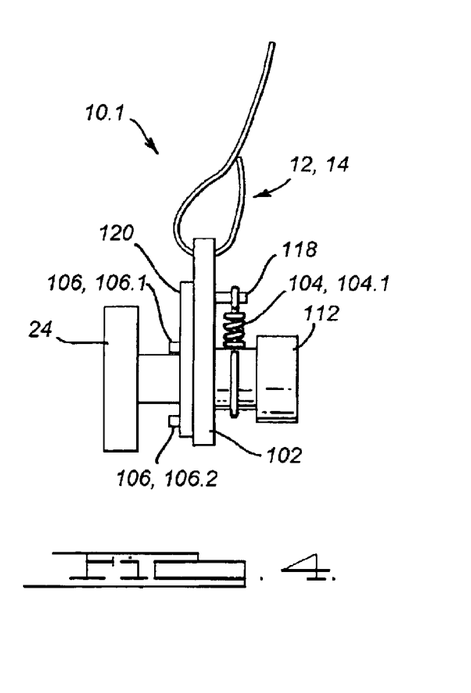
FIG. 4 illustrates a side view of a seat belt tension sensor in accordance with a first embodiment of a first aspect.
Figure 5A:
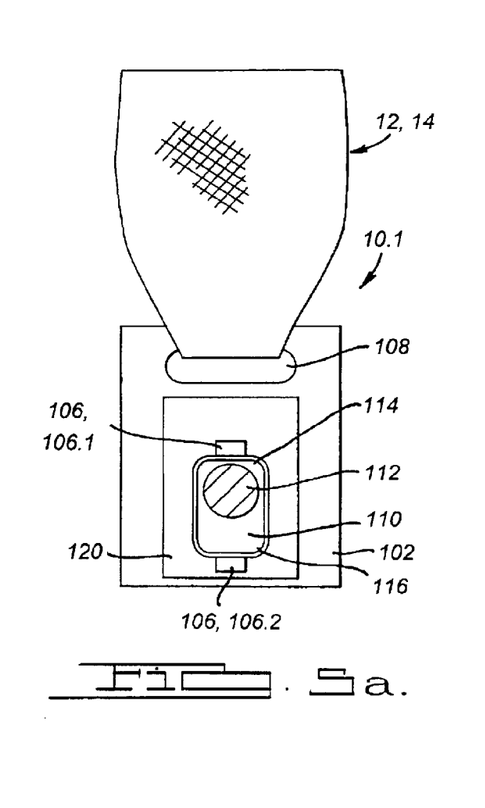
FIG. 5a illustrates a front view of a seat belt tension sensor in accordance with the first embodiment of the first aspect.
Figure 5B:
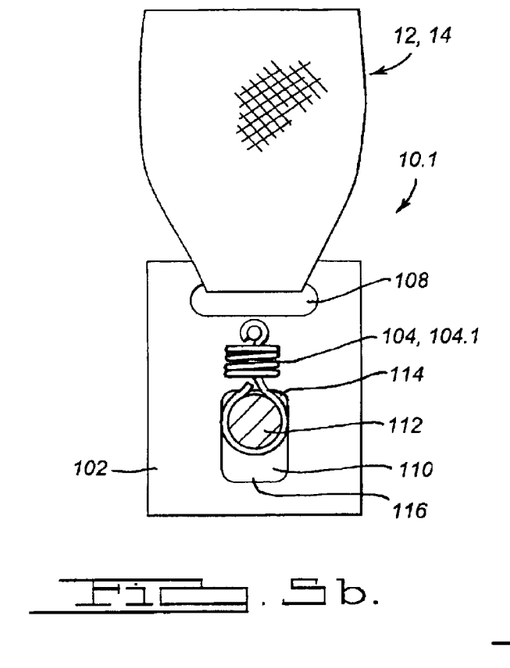
FIG. 5b illustrates a rear view of a seat belt tension sensor in accordance with the first embodiment of the first aspect.

Referring to FIGS. 4, 5a and 5b, in accordance with a first embodiment of a first aspect, a seat belt tension sensor 10.1 comprises an anchor plate 102, a spring element 104, and at least one proximity sensor 106. The anchor plate 102 comprises a webbing attachment opening 108 through which a webbing 12 of a seat belt 14 is looped and sewn back onto itself; and further comprises a first slot 110 through which the anchor plate 102 is attached to the vehicle frame 24 with an anchor bolt 112, wherein the first slot 110 enables the anchor plate 102 to move with respect to the anchor bolt 112 along the length of the anchor plate 102 between a first end 114 and a second end 116 thereof. For example, a tension from the webbing 12 applied to the anchor plate 102 acts to move the second end 116 of the first slot 110 towards the shank of the anchor bolt 112. The head of the anchor plate 102 is larger than the width of the first slot 110 so that the anchor plate 102 is captured thereby. The anchor plate 102 provides for attaching the seat belt 14 to the vehicle frame 24, and, for example, may be adapted from a conventional seat belt anchor plate that would otherwise incorporate a hole—rather than a first slot 110 for attachment therethrough by the anchor bolt 112 to the vehicle frame 24.

In the embodiment illustrated in FIGS. 4, 5a and 5b, the spring element 104 comprises a tension spring 104.1, e.g. a helical tension spring, that is operatively connected between the anchor bolt 112 and a pin 118 on the anchor plate 102, wherein the pin 118 is located between the webbing attachment opening 108 and the first slot 110. The tension spring 104.1 pulls the anchor plate 102 towards the shank of the anchor bolt 112 so that the first end 114 of the first slot 110 is pulled towards the shank of the anchor bolt 112, so as to bias the first end 114 of the first slot 110 of the anchor plate 102 towards the shank of the anchor bolt 112. The tension spring 104.1 may be adapted to preload the first end 114 of the first slot 110 of the anchor plate 102 against the shank of the anchor bolt 112—absent a force on the webbing attachment opening 100 from a tension in the webbing 12 of the seat belt 14—so as to eliminate "slack" between the anchor bolt 112 and the first slot 110 when the anchor plate 102 is in an "unloaded" condition.

The at least one proximity sensor 106 is responsive to the position of the shank of the anchor bolt 112 along the first slot 110, and provides a measure thereof, which in combination with the force-displacement properties of the spring element 104, provides a measure of the load applied to the anchor plate 102 by the webbing 12. For example, FIGS. 4 and 5a illustrate first 106.1 and second 106.2 proximity sensors located respectively proximate to the first 114 and second 116 ends of the first slot 110, i.e. each respectively proximate to the position of the shank of the anchor bolt 112 relative thereto. The at least one proximity sensor 106 may, for example, comprise a back-biased Hall-effect sensor (i.e. a Hall-effect sensor in combination with a magnet), a back-biased GMR (Giant magneto-resistive) sensor, another type of magnetic sensor e.g. an eddy current sensor, an optical sensor, or a capacitive sensor. The at least one proximity sensor 106 may, for example, be mounted on a printed circuit board 120 which is operatively connected to the anchor plate 102, e.g. as illustrated in FIG. 5a. Furthermore, the at least one proximity sensor 106 may be incorporated in a sealed subsystem, e.g. having a pigtail connector extending therefrom and connected to the at least one proximity sensor 106, e.g. for connection to a controller 52.

In operation, absent a load applied by the webbing 12 to the anchor plate 102, the spring element 104 biases the first end 114 of the first slot 110 of the anchor plate 102 towards the shank of the anchor bolt 112, so that the first proximity sensor 106.1 senses the anchor bolt 112 proximate thereto, which is indicative of a relatively low tension in the webbing 12 of the seat belt 14. As the tension of the webbing 12 is increased, the anchor plate 102 moves against a tension in the tension spring 104.1 so that the second end 116 of the first slot 110 moves closer to the anchor bolt 112. Responsive to an intermediate level of tension in the webbing 12, the anchor bolt 112 is intermediate to both the first 106.1 and second 106.2 proximity sensors, which provide respective signals indicative thereof. Responsive to a relatively high level of tension in the webbing 12 sufficient to fully extend the tension spring 104.1, the anchor bolt 112 is moved close to the second proximity sensor 106.2, which provides a signal indicative thereof. The minimum load that can be sensed by the seat belt tension sensor 10.1 corresponds to the minimum load necessary to deflect the spring element 104 so as to cause an incremental displacement of the first end 114 of the first slot 110 away from the anchor bolt 112. The maximum load that can be sensed by the seat belt tension sensor 10.1 corresponds to the minimum load necessary deflect the spring element 104 so that the second end 116 of the first slot 110 contacts the anchor bolt 112. A tension load greater than the maximum load that can be sensed is reacted by the anchor plate 102 without any further increase in load to the tension spring 104.1, other than perhaps a negligible increase that would result from a deformation of the anchor plate 102. Accordingly, the seat belt tension sensor 10 can measure tension loads that are within a measurement range, and can withstand much larger loads without substantial affect.

Figure 6:
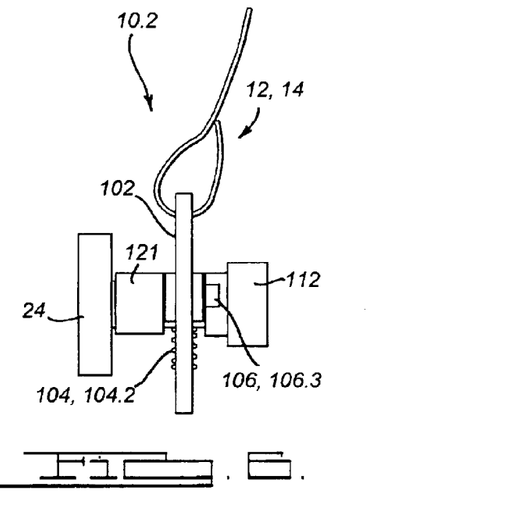
FIG. 6 illustrates a side view of a seat belt tension sensor in accordance with a second embodiment of the first aspect.

Referring to FIGS. 6, 7a, 7b, and 8, a second embodiment of the first aspect of a seat belt tension sensor 10.2 is similar to the first embodiment described hereinabove, except that 1) the spring element 104 comprises a compression spring 104.2, e.g. a helical compression spring, and 2) at least one proximity sensor 106 comprises a digital switch that changes state as the distance between the proximity sensor 106 and the anchor bolt 112 crosses a threshold. It should be understood the type of spring element 104 (e.g. tension 104.1 or compression 104.2) and the type of proximity sensor (continues or discrete) are independent of one another. For example, another embodiment could incorporate a compression spring 104.2 and continuous proximity sensor 106. FIG. 6 also illustrates a spacer bushing 121 located on the shank of the anchor bolt 112 between the seat belt tension sensor 10.2 and the vehicle frame 24 for spacing the seat belt tension sensor 10.2 therefrom so as to provide for sufficient clearance so that the anchor plate 102, and associated components, can freely move relative to the anchor bolt 112.

Figures 8, 9:
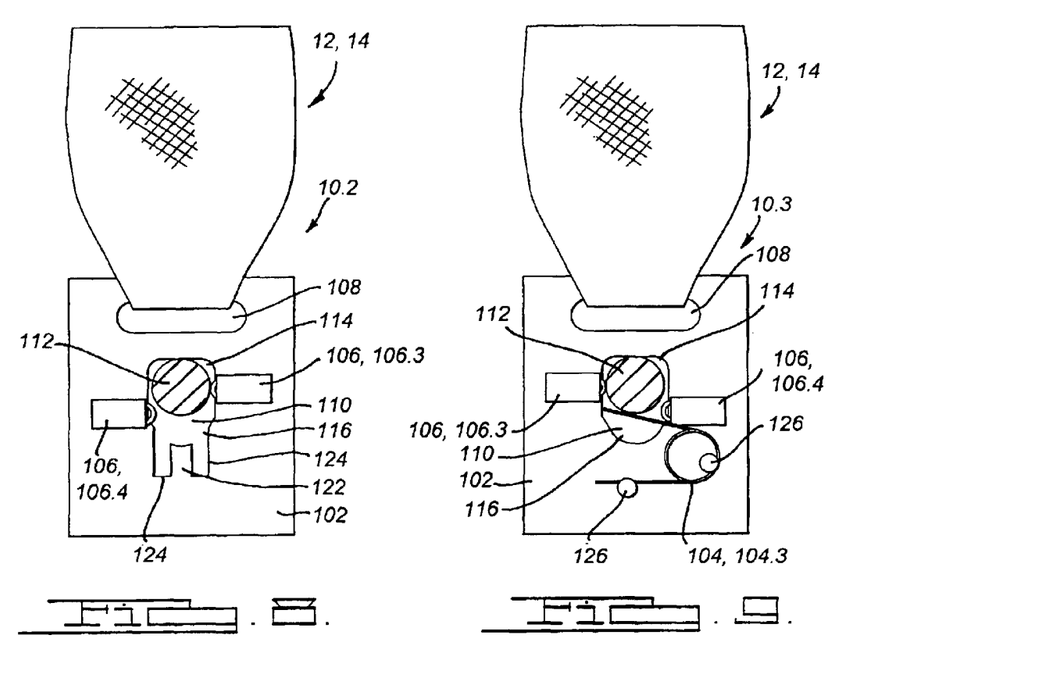
FIG. 8 illustrates a front view of a seat belt tension sensor in accordance with the second embodiment of the first aspect, with an associated spring element removed.
FIG. 9 illustrates a front view of a seat belt tension sensor in accordance with a third embodiment of the first aspect, under a relatively low seat belt tension loading condition.

The compression spring 104.2 is located proximate to the second end 116 of the first slot 110 so as to bias the first end 114 of the first slot 110 towards—or against—the anchor bolt 112. Referring to FIG. 8, anchor plate 102 may comprise a spring guide 122 upon or within which the helical compression spring 104.2 is located, and which, in combination with the second end 116 of the first slot 116 being contoured to match the shape of the shank of the anchor bolt 112, provides for restraining the relative motion of the anchor plate 102 with respect to the anchor bolt 112 for tension loads above a threshold, so as to limit the load that can be applied to the compression spring 104.2. For example, the spring guide 122 is formed between a pair of second slots 124 extending from the first slot 110 in the anchor plate 102, whereby the length of the second slots 124 is greater than the fully compressed length of the helical compression spring 104.2 so as to prevent the helical compression spring 104.2 from being "bottomed out" under high load conditions.

In operation, the compression spring 104.2 pushes the second end 116 of the first slot 110 away from the shank of the anchor bolt 112 so that, absent a load applied to the webbing attachment opening 108 from a tension in the webbing 12, the shank of the anchor bolt 112 contacts the first end 114 of the first slot 110, particularly if the compression spring 104.2 is preloaded so as to eliminate "slack" between the shank of the anchor bolt 112 and the first end 114 of the first slot 110. A preloading of the compression spring 104.2 is also beneficial in retaining the compression spring 104.2 within the anchor plate 102. As the tension load in the webbing 12 is increased, the compression spring 104.2 is compressed in accordance with an associated force-deflection characteristic, so that a particular deflection of the compression spring 104.2 is associated with a corresponding tension load. The maximum deflection of the compression spring 104.2—and the corresponding maximum tension load that can be measured occurs when the shank of the anchor bolt 112 "bottoms-out" against the second end 116 of the first slot 110. A tension load greater than this maximum level is reacted at the contact of the anchor plate 102 with the anchor bolt 112 without increasing the deflection of the compression spring 104.2 by more than a negligible amount.

Figure 7A:
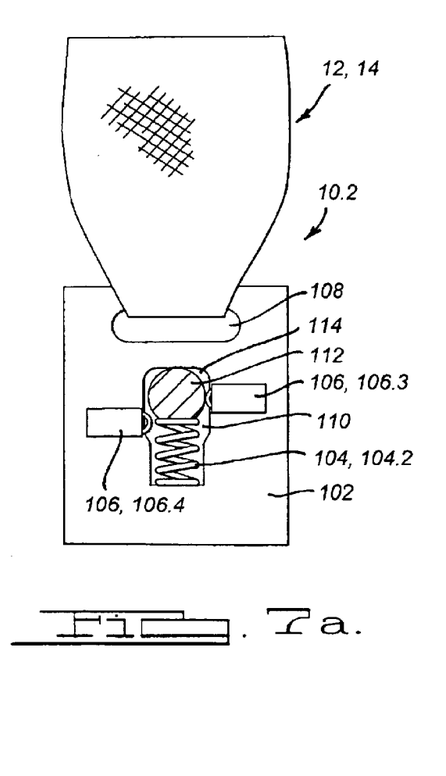
FIG. 7a illustrates a front view of a seat belt tension sensor in accordance with the second embodiment of the first aspect, under a relatively low seat belt tension loading condition.
Figure 7B:
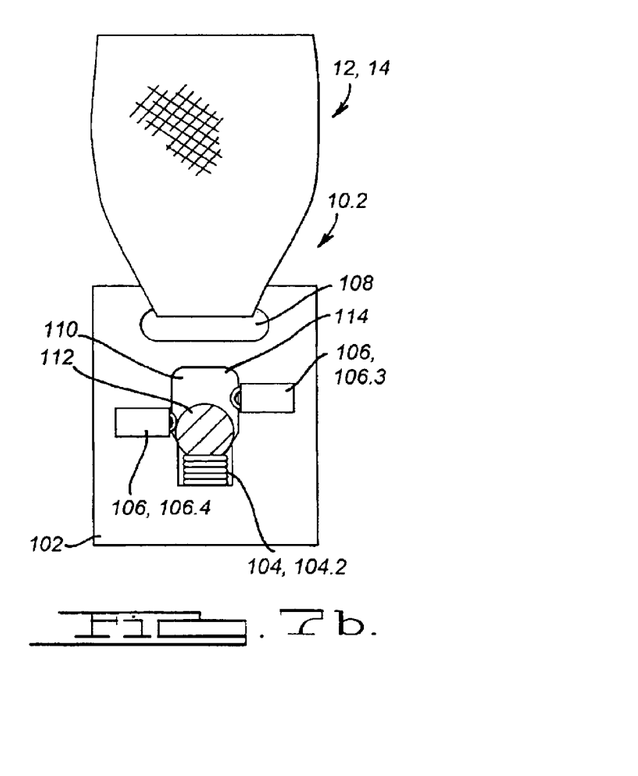
FIG. 7b illustrates a front view of a seat belt tension sensor in accordance with the second embodiment of the first aspect, under a relatively high seat belt tension loading condition.

The spring element 104 can be any type of spring, including but not limited to a wire spring or a flat spring. For example, FIGS. 4 and 5b illustrate a helical tension spring 104.1; and FIGS. 6, 7a and 7b illustrate a helical compression spring 104.2. Referring to FIG. 9, in accordance with a third embodiment of first aspect of the seat belt tension sensor 10.3, the spring element 104 comprises a torsion spring 104.3. The operation of the seat belt tension sensor 10.3 incorporating a torsion spring 104.3 is similar to that described hereinabove for a compression spring 104.2. The torsion spring 104.3 is located on the anchor plate 102 by a set of pins 126.

Generally, the seat belt tension sensor 10.1, 10.2, 10.3 measures seat belt tension by first applying the tension load across a spring element 104, and then measuring or responding to the deflection of the spring element 104. Accordingly, the accuracy and repeatability of the corresponding tension measurement is dependent at least in part upon the repeatability of the force-deflection characteristic of the spring element 104. The actual movement of the anchor plate 102 with respect to the anchor bolt 112 may, for example, be about 2–3 millimeters, or larger. The spring rate (e.g. force/distance) determines the associated tension load measurement range. For example, given a displacement of 0.08–0.12 inches, a spring rate of about 100 pounds/inch provides for an associated tension load measurement capacity of up to about 8–12 pounds.

Referring to FIGS. 6, 7a, 7b, 8 and 9, first 106.3 and second 106.4 proximity sensors are located along the sides of the first slot 110 so as to be respectively responsive to the proximity of the shank of the anchor bolt 112 when located at the first 114 and second 16 ends of the first slot 110. The first 106.3 and second 106.4 proximity sensors are digital switches, e.g. momentary contact mechanical switches—that change state as the distance between the proximity sensor 106.3, 106.4 and the anchor bolt 112 crosses a threshold. Accordingly, the first 106.3 and second 106.4 proximity sensors provide for three different measurement states as follows: 1) low tension load when the first proximity sensor 106.3 is active, 2) intermediate tension load when neither the first 106.3 nor second 106.4 proximity sensors are active, and 3) high tension load when the second proximity sensor 106.4 is active.

As with other embodiments, one or both of the proximity sensors 106 can be adapted to provide a continuous measure of proximity, e.g. linear proximity sensors 106 whose output varies continuously as the distance between the proximity sensors 106 and the anchor bolt 112 varies, so as to provide a continuous measure of seat belt tension. The proximity sensors 106 can be located anywhere that is responsive to the position of the anchor bolt 112 relative to the anchor plate 102, e.g. on either end of the first slot 110 as illustrated in FIGS. 4 and 5a; on the sides of the first slot 110 as illustrated in FIGS. 6, 7a, 7b, 8 and 9; or elsewhere.

In yet another embodiment, the seat belt tension sensor 10 may comprise only one proximity sensor 106, either continuous or discrete. For example, a discrete proximity sensor 106, e.g. switch, located at the second end 116 of the first slot 110 would provide an indication of whether the associated seat belt tension load exceeded a threshold. A continuous proximity sensor 106 located proximate to the first end of the first slot 110 would generally be more sensitive to relatively low seat belt tension loads, whereas a continuous proximity sensor 106 located proximate to the second end 116 of the first slot 110 would generally be more sensitive seat belt tension loads that are relatively high within the associated measurement range.

The proximity sensors can be located within a housing, e.g. a plastic cover, to protect the components and to provide for convenient installation of the entire assembly onto the anchor plate, wherein the housing would be relatively fixed with respect to the anchor plate.

The seat belt tension sensor 10.1, 10.2, 10.3 can be packaged relatively compactly and provides for the measurement of a range of seat belt tensions that correspond to a relatively large range of relative displacement of the anchor plate 102 relative to the anchor bolt 112.

Referring to FIGS. 10–13, in accordance with a second aspect, the seat belt tension sensor 10.4 comprises a bracket 202 that is adapted to be attached to a structural member of a passenger vehicle e.g. the vehicle frame 24—using an anchor bolt 112 through a hole 204 at the in a lower portion 206 of the bracket 202. The upper end 208 of the bracket 202 incorporates a pair of fingers 202.1 that wrap around and retain the upper end of a shroud 210 that engages with the bracket 202 so as to form a cavity 212 therebetween. A carriage 214 is located in the cavity 212 between the bracket 202 and the shroud 210. The bracket 202, carriage 214 and shroud 210 each incorporate an opening 216 through which a seat belt is looped. The carriage 214 is adapted to slide within the cavity 212 toward or away from the upper end 208. The openings 216 in the bracket 202 and shroud 210 comprise substantially parallel sides 218 that are engaged by the carriage 214, thereby defining the path having corresponding directions of travel over which the carriage 214 can slide within the cavity 212.

Figure 13:
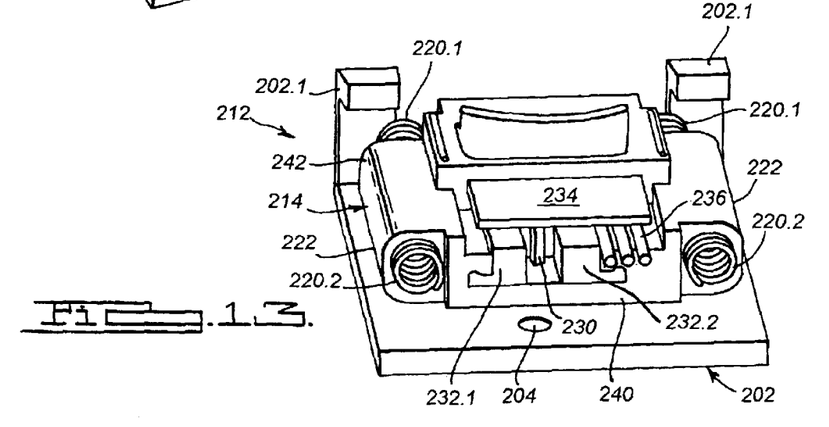
FIG. 13 illustrates an isometric view of the seat belt tension sensor assembly first illustrated in FIG. 10, with an associated shroud removed.

Referring to FIG. 13, at least one first spring 220.1—for example, a first pair of helical compression springs within at least one corresponding spring guide 222, biases the carriage 214 away from the upper end 208 of the bracket 202. Furthermore, at least one second spring 220.2—for example, a second pair of helical compression springs within at least one corresponding spring guide 222, biases the carriage 214 away from the lower portion 206 of the bracket 202. Accordingly, absent an external load to the carriage 214, e.g. from a seat belt, the position of the carriage within the cavity 212—and the corresponding deflections of the at least one first 220.1 and second 220.2 springs—is such that the load on the carriage 214 from the at least one first spring 220.1 is equal in magnitude to that of the at least second spring 220.2.

Figure 12:
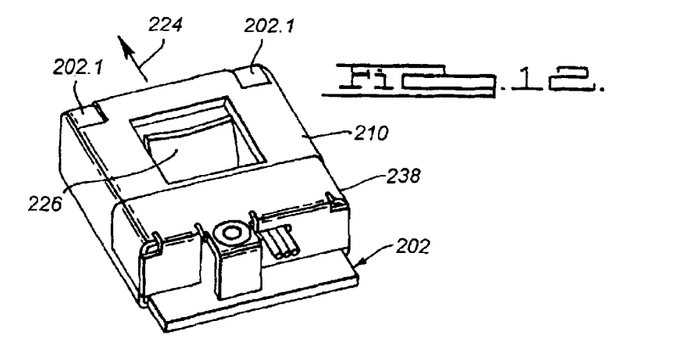
FIG. 12 illustrates an isometric view of the seat belt tension sensor assembly first illustrated in FIG. 10.

The size of the opening 216 in the carriage 214 is less that that of the openings 216 in the bracket 202 and shroud 210, and the carriage 214, springs 220., 220.2, shroud 210 and bracket 202 are adapted so that the opening 216 in the carriage 214 is biased towards the lower portion 206 of the bracket 202 absent a tension load applied to the seat belt 14. Referring to FIG. 12, the tension load 224 in the seat belt 14 is applied against the top side 226 of the opening 216 in the carriage 214 by the seat belt webbing 12 that is looped therethrough. In FIG. 12 the looping of the seat belt webbing 12 is not illustrated, and the tension load 224 is illustrated schematically. The carriage 214 moves relative to the bracket 202 and shroud 210 responsive to a tension load 224 applied to the carriage 214 by a displacement that is dependent upon the effective spring rate of the first 220.1 and second 220.2 springs. At a limiting level of tension load 224, the carriage 214 bottoms out against the top side 228 of the openings 216 in the shroud 210 and the bracket 202, so that the remaining load is applied to the bracket 202 without causing a corresponding displacement of the carriage 214 within the cavity 212.

For a given effective spring rate, the seat belt tension is measured by measuring the displacement of the carriage 214 relative to the bracket 202. Referring to FIG. 13, the displacement is measured by using a magnetic field sensor 230 e.g. a Hall-effect sensor attached to the shroud 210 (not shown in FIG. 13) to measure the magnetic field generated by a pair of magnets 232.1, 232.2 that are attached to the carriage 214. The magnetic field sensor 230 is mounted on a circuit board 234 that is attached to the shroud 210, and power and signal connections are made to the magnetic field sensor 230 via wire leads 236 that are coupled to the circuit board 234.

Figure 14A:
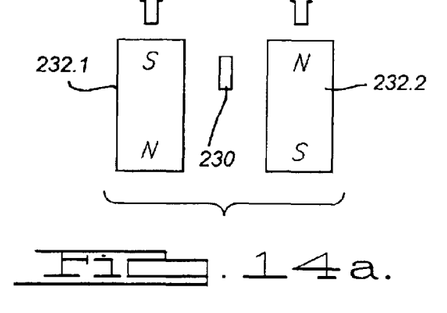
FIG. 14a illustrates an arrangement of a magnetic field sensor and an associated pair of magnets incorporated in the seat belt tension sensors illustrated in FIGS. 10–13 and 16–18.
Figure 14B:
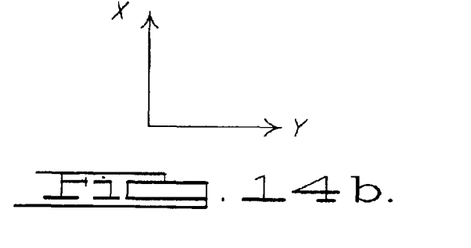

Referring to FIG. 14a, the N-S axes of the magnets are aligned with the direction of travel, the poles N, S of the magnets 232.1, 232.2 are crossed relative to one another, and the magnetic field sensor 230 is located between the magnets 232.1, 232.2. In accordance with this arrangement, the distance between the magnetic field sensor 230 and either of the magnets 232.1, 232.2 is relatively invariant with respect to the position of the carriage 214 along the direction of travel (X-axis as illustrated in FIG. 14b). Furthermore, with the poles N, S of the magnets 232.1, 232.2 crossed relative to one another, the strength and direction of the Y-axis component of magnetic field—as is measured by the magnetic field sensor 230—is dependent upon the X-axis location between the magnets 232.1, 232.2. Accordingly, the magnetic field sensed by the magnetic field sensor 230 is dependent upon the displacement of the carriage relative to the magnetic field sensor 230/shroud 210, the linearity of which is improved by having the poles N, S of the magnets 232.1, 232.2 crossed relative to one another.

Figure 10:
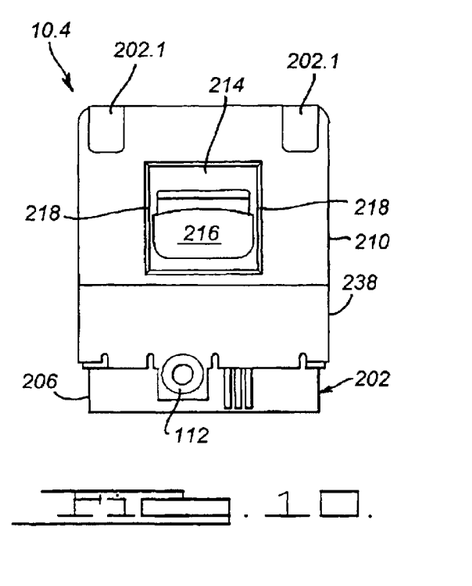
FIG. 10 illustrates a front view of a second aspect of a seat belt tension sensor assembly.
Figure 11:
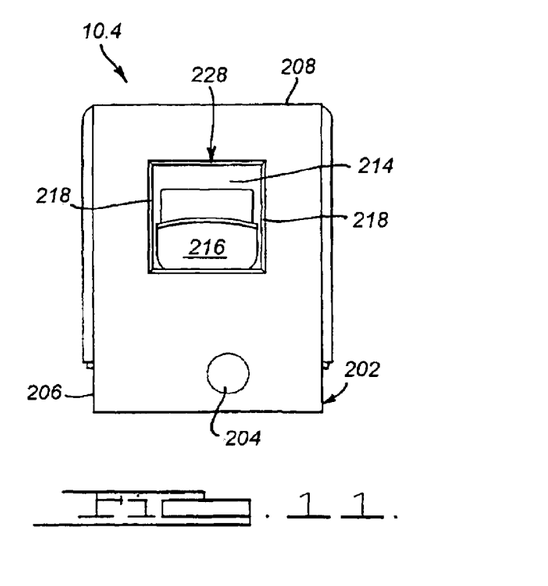
FIG. 11 illustrates a rear view of the seat belt tension sensor assembly first illustrated in FIG. 10.

Referring to FIGS. 10 and 12, the seat belt tension sensor 10.4 further comprises a magnetic shield 238 that covers the lower end of the shroud proximate to the magnetic field sensor 230 so as to shield the magnetic field sensor 230 from the affect of stray magnetic fields.

The seat belt tension sensor 10.4 incorporates at least one second spring 220.2 on the non-restraining end 240 of the carriage 214, in addition to the at least one first spring 220.1 on the restraining end 242 of the carriage 214, which together maintain the carriage 214 in an equilibrium position. The restraining end 242 is the end of the carriage 214 on which the at least one first spring 220.1 is located, and against which a reaction force reacts responsive to a tension load 224 from the seat belt so as to maintain the carriage in a state of equilibrium. The non-restraining end 240 is the opposite end of the carriage 214 on which the at least one second spring 220.2 is located. The carriage 214 is maintained in the equilibrium position by forces acting on both ends 240, 242, yet provides for incremental motion thereof responsive to an incremental seat belt tension load 224. Accordingly, the seat belt tension sensor 10.4 is capable of continuously measuring non-zero tension loads 224. The compliance of the at least one second spring 220.2 would typically be substantially greater, i.e. a lower spring rate, than the corresponding compliance of the at least one first spring 220.1, e.g. about ten times greater. The arrangement of springs 220., 220.2 on both the restraining 242 and non-restraining 240 ends of the carriage 214 improves accuracy under low load conditions.

Figure 15:
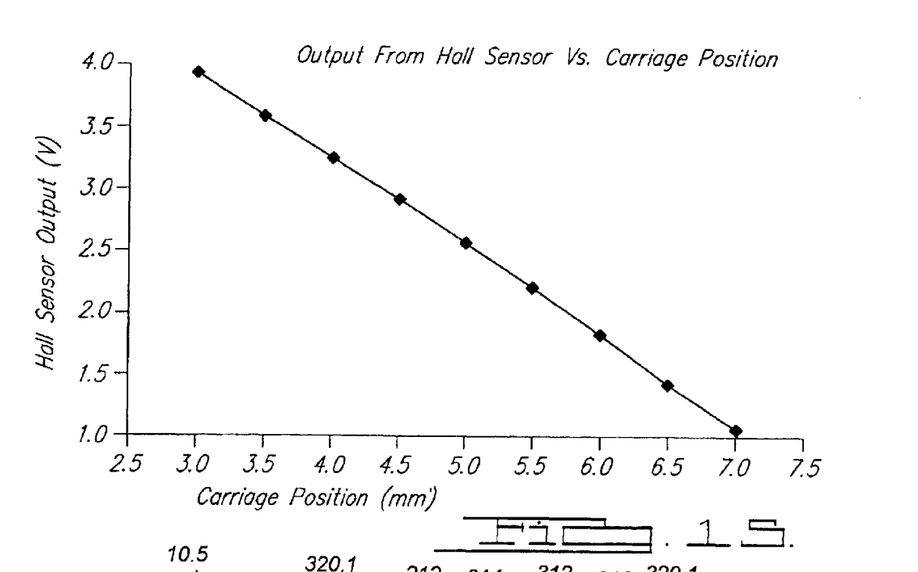

The seat belt tension sensor 10.4 incorporates first 232.1 and second 232.2 magnets on the carriage 214 that surround the magnetic field sensor 230 therebetween, which provides for a substantially linear relationship of the magnetic field sensed by the magnetic field sensor 230 with respect to the X-position of the first 232.1 and second 232.2 magnets relative thereto. Referring to FIG. 15, the output of a Hall-effect magnetic field sensor 230 is plotted as a function of carriage position, illustrating a slope of about −0.72 volts per millimeter of travel. For a seat belt tension sensor 10.4 having a corresponding range of travel and force-deflection characteristic so as to provide a measurement range of 16 pounds, the results of FIG. 15 correspond to a seat belt tension measurement sensitivity of 5.57 pounds per volt of the signal from the magnetic field sensor 230.

Figure 16:
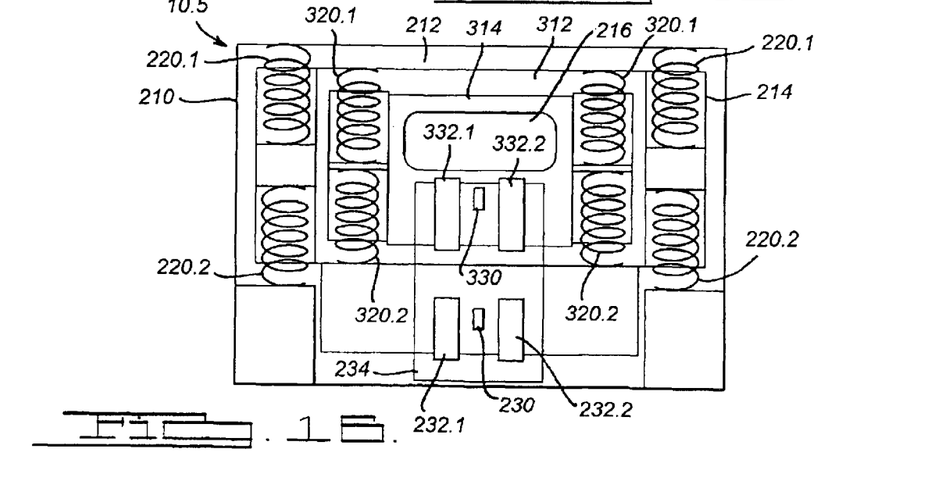
FIG. 16 illustrates a front view of a carriage assembly in accordance with a third aspect of a seat belt tension sensor.

Referring to FIG. 16, in accordance with a third aspect of a seat belt tension sensor 10.5, the seat belt tension sensor 10.5 is adapted with redundant sensing elements so as to provide redundant measurements, so as to mitigate against an otherwise potential source of an undiagnosable single point error in the safety system. For example, in a seatbelt tension sensor 10.4 having only one moving part, if the single moving part becomes stuck for some reason, possibly because of mechanical damage or an interfering foreign object in the seat belt tension sensor 10.4, the seat belt tension sensor 10.4 could possibly indicate low belt tension even when there is a high seat belt tension load 224, e.g. for a child seat situation. Such a failure could possibly cause the air bag to deploy when a child seat 44 is secured to the vehicle seat 46.

This problem is mitigated by modifying the arrangement of the second aspect Illustrated in FIG. 13 to incorporate a second carriage 314 that is adapted to move with respect to the carriage 214 (or first carriage 214) wherein the second carriage 314 is disposed with a second cavity 312 within the first carriage 214 and is provided with third 320.1 and fourth 320.2 springs that bias the second carriage 314 to an equilibrium position within the second cavity 312 of the first carriage 214. The second carriage 314 incorporates an opening 216 through which the seat belt webbing 12 is looped. The second carriage 314 incorporates third 332.1 and fourth 332.2 magnets oriented so that the corresponding N-S poles are crossed, similar to how the N-S poles of first 232.1 and second 232.2 magnets on the first carriage 214 are oriented, as illustrated in FIG. 14a. A second magnetic field sensor 330 is mounted on the same circuit board 234 as is the first magnetic field sensor 230, and is located between the third 332.1 and fourth 332.2 magnets. With the second magnetic field sensor 330 so mounted, the travel of the third 332.1 and fourth 332.2 magnets relative to the second magnetic field sensor 330 is normally greater than the travel of the first 232.1 and second 232.2 magnets relative to the first magnetic field sensor 230 because the third 320.1 and fourth 320.2 springs are effectively in series with the first 220.1 and second 220.2 springs respectively, thereby increasing the effective compliance of the combination of springs. Accordingly, the third 332.1 and fourth 332.2 magnets are, for example, longer than the first 232.1 and second 232.2 magnets so as to provide for a longer stroke of the second carriage 314 relative to the bracket 202/shroud 210. Alternately, if the second magnetic field sensor 330 were relatively fixed with respect to the first carriage 214, rather than to the bracket 202/shroud 210, then the relative travel thereof with respect to the third 332.1 and fourth 332.2 magnets would be independent of the motion of the first carriage 214 with respect to the bracket 202/shroud 210, so that the third 332.1 and fourth 332.2 magnets would not necessarily need to be made longer for the same range of load measurements. Generally, any difference in calibration of the second magnetic field sensor 330 from that of the first magnetic field sensor 230 could be accommodated by a signal processor that processes the signals from first 230 and second 330 magnetic field sensors.

The first 230 and second 330 magnetic field sensors provide for detecting or diagnosing failures in the associated seat belt tension sensor 10.5. For example, if one or more of the springs break, or if any of the magnets or magnetic field sensors fail, the signals from the first 230 and second 330 magnetic field sensors would indicate substantially different associated seat belt tension loads 224, which would be indicative of a fault.

Figure 17:
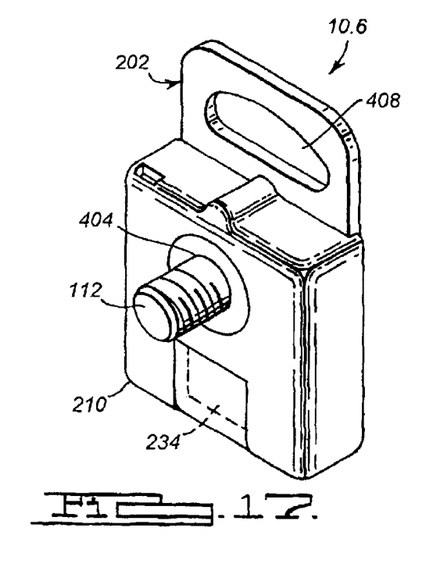
FIG. 17 illustrates a front isometric view of a seat belt tension sensor assembly in accordance with a variation of the third aspect of a seat belt tension sensor.
Figure 18:
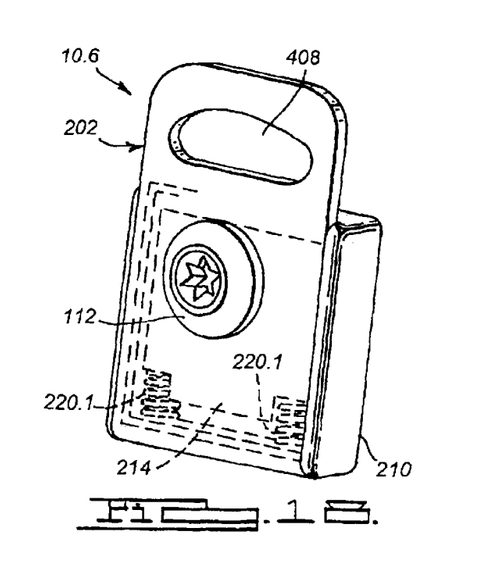
FIG. 18 illustrates a rear isometric view of the seat belt tension sensor assembly illustrated in FIG. 17.

Referring to FIGS. 17 and 18, in accordance with a variation of the third aspect, a seat belt tension sensor 10.6 comprises essentially all of the elements of the seat belt tension sensor 10.4 illustrated in FIGS. 10–14a, but arranged in a different way. More particularly, the carriage 214 is adapted with a hole 404 through which the seat belt tension sensor 10.4 is attached to the vehicle frame 24 with the anchor bolt 112. The bracket 202, sans fingers 202.1, is extended in the direction of the restraining end 242 of the carriage 214 relative to the hole 404, so as to provide for a webbing attachment opening 408 through which the webbing 12 of the seat belt 14 is looped and sewn back onto itself. The shroud 210 is secured to the bracket 202, e.g. by a fastener. Whereas FIGS. 17 and 18 illustrate the head of the anchor bolt 112 on the bracket-side of the seat belt tension sensor 10.6, the seat belt tension sensor 10.6 could also be attached to the vehicle frame 24 with the head of the anchor bolt 112 on the shroud-side.

In operation, the carriage 214 and the first 232.1 and second 232.2 magnets do not move with respect to the anchor bolt 112. Instead, when a force is applied to the webbing attachment opening 408 from a tension in the webbing 12 of the seat belt 14, the bracket 202 and shroud 210 move relative to the carriage 214 by an amount that is dependent upon both 1) the amount of tension load 224, and 2) the effective force-deflection properties of the first 220.1 and second 220.2 springs. The magnetic field sensor 230 senses the relative motion, which for loads within the range of the seat belt tension sensor 10.6 provides a measure of the seat belt tension load 224 as described hereinabove. The circuit board 234 and associated components can be mounted either proximate to the non-restraining end 240 of the carriage 214, as illustrated in FIGS. 17 and 18; proximate to the opposite end of the carriage; or elsewhere depending upon where the first 232.1 and second 232.2 magnets are mounted on the carriage.

It should be understood that the Hall-effect magnetic field sensor 230 can be adapted to cooperate with a single magnet, rather than a pair of magnets as described and illustrated hereinabove.

While specific embodiments have been described in detail in the foregoing detailed description and illustrated in the accompanying drawings, those with ordinary skill in the art will appreciate that various modifications and alternatives to those details could be developed in light of the overall teachings of the disclosure.

For example, notwithstanding that the above examples disclose an anchor bolt 112 for operatively coupling the seat belt tension sensor 10 to the vehicle frame 24, it should be understood that the anchor bolt 112 could be coupled to another element that is in turn coupled to the vehicle frame 24, or the seat belt tension sensor 10 could be operatively coupled to the vehicle frame 24 with a pin, e.g. that engages a shackle that is operatively coupled to the vehicle frame 24. Accordingly, the term anchor bolt is intended to include an element that is adapted to engage the seat belt tension sensor 10 as would an anchor bolt 112, even though that element might not incorporate threads.

As another example, the seat belt webbing 12 can be operatively coupled to the seat belt tension sensor 10 by other means, e.g. looping the seat belt webbing 12 through the associated attachment opening 108, 216, 408 and allowing the webbing 12 to slide therethrough, or looping the seat belt webbing 12 through another element that is operatively connected to the seat belt tension sensor 10. For example, the seat belt webbing 12 could be operatively connected to a latch plate 32 that is adapted to connect with an associated buckle 34, which is operatively connected to or associated with the seat belt tension sensor 10.

As yet another example, notwithstanding the embodiment of FIG. 8 illustrates a plurality of second slots 124 that engage the associated compression spring 104.2, the compression spring 104.2 could also be located within a single second slot 124 that is narrower than the anchor bolt 112 so that the anchor bolt 112 is precluded from sliding therein.

As yet another example, in the embodiment illustrated in FIGS. 4, 5a and 5b, the tension spring 104.1 could alternately be hooked into a hole or slot in the anchor plate 102, rather than connected to a pin 118 thereon.

Although the spring guide 222 is illustrated in FIGS. 13, 16 and 18 as a cavity within which the associated springs are at least partially contained, it should be understood that the spring guide 222 could also comprise a pin around which at least a portion of the spring is located, e.g. as illustrated in FIG. 8. Furthermore, the spring guide 222 could alternately comprise a cavity that is partially open along the sides thereof, e.g. along the outboard sides of the associated carriage 214. Yet further, the shroud 210 could be adapted to cooperate in retaining the spring within a cavity of the spring guide 222.

Accordingly, the particular arrangements disclosed are meant to be illustrative only and not limiting as to the scope of the invention, which is to be given the full breadth of the appended claims and any and all equivalents thereof.

We claim:

1. A seat belt tension sensor adapted to operatively couple to a vehicle frame with an anchor bolt, comprising:
   a. an anchor plate, wherein said anchor plate is adapted to operatively couple to a webbing of a seat belt;
   b. a first slot in said anchor plate, wherein said first slot is adapted to provide for operatively coupling said anchor plate to the vehicle frame with the anchor bolt through said first slot, said first slot slideably engages the anchor bolt, and said first slot is adapted to limit the travel of the anchor bolt relative to said first slot responsive to a tension applied to the seat belt when the seat belt is operatively coupled to said anchor plate and said anchor plate is operatively coupled to the vehicle frame with the anchor bolt through said first slot;
   c. a spring operative between said anchor plate and the anchor bolt when said anchor plate is operatively coupled to the vehicle frame with the anchor bolt, wherein said spring biases said slot relative to the anchor bolt, a tension in the seat belt causes a deflection of said spring and an associated motion of the anchor bolt in said slot, and the magnitude of said deflection is responsive to a magnitude of said tension; and
   d. at least one proximity sensor operatively coupled to said anchor plate, wherein said at least one proximity sensor is responsive to a proximity thereof to the anchor bolt, and thereby, said proximity sensor is responsive to a position of the anchor bolt within said first slot responsive to deflection of said spring responsive to said tension in the seat belt.

2. A seat belt tension sensor adapted to operatively couple to a vehicle frame with an anchor bolt as recited in claim 1, wherein said anchor plate comprises an attachment opening, and said anchor plate is operatively coupled to said webbing by looping said webbing through said attachment opening.

3. A seat belt tension sensor adapted to operatively couple to a vehicle frame with an anchor bolt as recited in claim 1, wherein said spring comprises a tension spring operatively coupled to said anchor plate at a location between the anchor bolt and a location where said anchor plate is operatively coupled to the webbing of the seat belt.

4. A seat belt tension sensor adapted to operatively couple to a vehicle frame with an anchor bolt as recited in claim 1, wherein at least one said proximity sensor comprises either a back-biased Hall-effect sensor, a GMR sensor, an eddy current sensor, an optical sensor or a capacitive sensor.

5. A seat belt tension sensor adapted to operatively couple to a vehicle frame with an anchor bolt as recited in claim 1, wherein at least one said proximity sensor comprises a switch, said switch is adapted to engage the anchor bolt, and a state of said switch is responsive to whether or not said anchor bolt is engaged with the anchor bolt.

6. A seat belt tension sensor adapted to operatively couple to a vehicle frame with an anchor bolt, comprising:
   a. a bracket, wherein said bracket is adapted to operatively couple to one of a webbing of a seat belt and the anchor bolt, and said bracket comprises a first opening adapted to accept the other of the anchor bolt and the webbing of the seat belt:
   b. a first carriage, wherein said bracket and said first carriage are adapted for said first carriage to slide relative to said bracket in a first direction or in a direction opposite to said first direction, and said first carriage comprises a second opening that cooperates with said first opening and is adapted to operatively engage said other of the anchor bolt and the webbing of the seat belt, whereby a tension in the seat belt reacted by the anchor bolt causes said first carriage to move in said first direction relative to said bracket;
   c. at least one first spring operative between said first carriage and said bracket, wherein said at least one first spring is adapted to bias said first carriage relative to said bracket in a direction opposite to said first direction;
   d. at least one second spring operative between said first carriage and said bracket, wherein said at least one second spring is adapted to bias said first carriage in said first direction relative to said bracket, and said first and second springs are adapted so as to substantially eliminate slack between said first carriage and said first and second springs; and
   e. a first displacement sensor adapted to measure a displacement of said first carriage relative to said bracket.

7. A seat belt tension sensor adapted to operatively couple to a vehicle frame with an anchor bolt as recited in claim 6, wherein said bracket is adapted to operatively couple to the anchor bolt, and said second opening is adapted to operatively engage the webbing of the seat belt.

8. A seat belt tension sensor adapted to operatively couple to a vehicle frame with an anchor bolt as recited in claim 6, wherein said bracket is adapted to operatively couple to the webbing of the seat belt, and said second opening is adapted to operatively engage the anchor bolt.

9. A seat belt tension sensor adapted to operatively couple to a vehicle frame with an anchor bolt as recited in claim 6, wherein at least one said first spring comprises a first compression spring, and said first carriage comprises a first spring guide adapted to laterally constrain at least a portion of said first compression spring.

10. A seat belt tension sensor adapted to operatively couple to a vehicle frame with an anchor bolt as recited in claim 9, wherein said spring guide comprises a first cavity in said first carriage, a portion of said first compression spring is located within said first cavity, and a depth of said first cavity is greater than a fully compressed length of said first compression spring.

11. A seat belt tension sensor adapted to operatively couple to a vehicle frame with an anchor bolt as recited in claim 6, wherein at least one said second spring comprises a second compression spring, and said first carriage comprises a second spring guide adapted to laterally constrain at least a portion of said second compression spring.

12. A seat belt tension sensor adapted to operatively couple to a vehicle frame with an anchor bolt as recited in claim 11, wherein said spring guide comprises a second cavity in said first carriage, and a portion of said second compression spring is located within said second cavity.

13. A seat belt tension sensor adapted to operatively couple to a vehicle frame with an anchor bolt as recited in claim 6, wherein said first displacement sensor comprises:
   a. a first magnetic sensor operatively coupled to said bracket;
   b. a first magnet operatively coupled to said first carriage, wherein a north pole of said first magnet is located in said first direction relative to a south pole of said first magnet; and
   c. a second magnet operatively coupled to said first carriage, wherein a south pole of said second magnet is located in said first direction relative to a north pole of said second magnet, wherein said first magnetic sensor is located between said first and second magnets.

14. A seat belt tension sensor-adapted to operatively couple to a vehicle frame with an anchor bolt as recited in claim 13, wherein said first magnetic sensor Is selected from a Hall-effect sensor and a GMR sensor.

15. A seat belt tension sensor adapted to operatively couple to a vehicle frame with an anchor bolt, comprising:
   a. a bracket, wherein said bracket is adapted to operatively couple to one of a webbing of a seat belt and the anchor bolt, and said bracket comprises a first opening adapted to accept the other of the anchor bolt and the webbing of the seat belt;
   b. a first carriage, wherein said bracket and said first carriage are adapted for said first carriage to slide relative to said bracket in a first direction or in a direction opposite to said first direction, and said first carriage comprises a second opening that cooperates with said first opening and is adapted to operatively engage said other of the anchor bolt and the webbing of the seat belt, whereby a tension in the seat belt reacted by the anchor bolt causes said first carriage to move in said first direction relative to said bracket;
   c. at least one first spring operative between said first carriage and said bracket, wherein said at least one first spring is adapted to bias said first carriage relative to said bracket in a direction opposite to said first direction; and
   d. a first displacement sensor adapted to measure a displacement of said first carriage relative to said bracket, wherein said first displacement sensor comprises:
      i. a first magnetic sensor operatively coupled to said bracket;
      ii. a first magnet operatively coupled to said first carriage, wherein a north pole of said first magnet is located in said first direction relative to a south pole of said first magnet, and
      iii. a second magnet operatively coupled to said first carriage, wherein a south pole of said second magnet is located in said first direction relative to a north pole of said second magnet, wherein said first magnetic sensor is located between said first and second magnets.

16. A seat belt tension sensor adapted to operatively couple to a vehicle frame with an anchor bolt as recited in claim 15, wherein said bracket is adapted to operatively couple to the anchor bolt, and said second opening is adapted to operatively engage the webbing of the seat belt.

17. A seat belt tension sensor adapted to operatively couple to a vehicle frame with an anchor bolt as recited in claim 15, wherein said bracket is adapted to operatively couple to the webbing of the seat belt, and said second opening is adapted to operatively engage the anchor bolt.

18. A seat belt tension sensor adapted to operatively couple to a vehicle frame with an anchor bolt as recited in claim 15, wherein at least one said first spring comprises a first compression spring, and said first carriage comprises a first spring guide adapted to laterally constrain at least a portion of said first compression spring.

19. A seat belt tension sensor adapted to operatively couple to a vehicle frame with an anchor bolt as recited in claim 18, wherein said spring guide comprises a first cavity in said first carriage, a portion of said first compression spring is located within said first cavity, and a depth of said first cavity is greater than a fully compressed length of said first compression spring.

20. A seat belt tension sensor adapted to operatively couple to a vehicle frame with an anchor bolt as recited in claim 15, wherein said first magnetic sensor is selected from a Hall-effect sensor and a GMR sensor.

21. A seat belt tension sensor adapted to operatively couple to a vehicle frame with an anchor bolt, comprising:
 a. a bracket, wherein said bracket is adapted to operatively couple to one of a webbing of a seat belt and the anchor bolt, and said bracket comprises a first opening adapted to accept the other of the anchor bolt and the webbing of the seat belt;
 b. a first carriage, wherein said bracket and said first carriage are adapted for said first carriage to slide relative to said bracket in a first direction or in a direction opposite to said first direction, and said first carriage comprises a second opening that cooperates with said first opening and is adapted to operatively engage said other of the anchor bolt and the webbing of the seat belt, whereby a tension In the seat belt reacted by the anchor bolt causes said first carriage to move in said first direction relative to said bracket;
 c. a second carriage, wherein said first carriage and said second carriage are adapted for said second carriage to slide relative to said first carriage within said second opening in said first direction or in said direction opposite to said first direction, and said first carriage comprises a third opening that cooperates with said first and second openings and is adapted to engage said other of the anchor bolt and the webbing of the seat belt, whereby a tension in the seat belt reacted by the anchor bolt causes said second carriage to move in said first direction relative to said first carriage;
 d. at least one first spring operative between said first carriage and said bracket, wherein said at least one first spring is adapted to bias said first carriage relative to said bracket in a direction opposite to said first direction;
 e. at least one third spring operative between said first and second carriages, wherein said at least one third spring is adapted to bias said second carriage relative to said first carriage in a direction opposite to said first direction;
 f. a first displacement sensor adapted to measure a displacement of said first carriage relative to said bracket; and
 g. a second displacement sensor adapted to measure a displacement of said second carriage relative to said bracket.

22. A seat belt tension sensor adapted to operatively couple to a vehicle frame with an anchor bolt as recited in claim 21, further comprising at least one second spring operative between said first carriage and said bracket, wherein said at least one second spring is adapted to bias said first carriage in said first direction relative to said bracket, and said first and second springs are adapted so as to substantially eliminate slack between said first carriage and said first and second springs.

23. A seat belt tension sensor adapted to operatively couple to a vehicle frame with an anchor bolt as recited in claim 21, further comprising at least one fourth spring operative between said first and second carriages, wherein said at least one fourth spring is adapted to bias said second carriage in said first direction relative to said first carriage, and said third and fourth springs are adapted so as to substantially eliminate slack between said second carriage and said third and fourth springs.

24. A seat belt tension sensor adapted to operatively couple to a vehicle frame with an anchor bolt as recited in claim 21, wherein said bracket is adapted to operatively couple to the anchor bolt, and said third opening is adapted to operatively engage the webbing of the seat belt.

25. A seat belt tension sensor adapted to operatively couple to a vehicle frame with an anchor bolt as recited in claim 21, wherein said bracket is adapted to operatively couple to the webbing of the seat belt, and said third opening is adapted to operatively engage the anchor bolt.

26. A seat belt tension sensor adapted to operatively couple to a vehicle frame with an anchor bolt as recited in claim 21, wherein said first displacement sensor comprises:
 a. a first magnetic sensor operatively coupled to said bracket;
 b. a first magnet operatively coupled to said first carriage, wherein a north pole of said first magnet is located in said first direction relative to a south pole of said first magnet; and
 c. a second magnet operatively coupled to said first carriage, wherein a south pole of said second magnet is located in said first direction relative to a north pole of said second magnet, wherein said first magnetic sensor is located between said first and second magnets.

27. A seat belt tension sensor adapted to operatively couple to a vehicle frame with an anchor bolt as recited in claim 21, wherein said second displacement sensor comprises:
 a. a second magnetic sensor operatively coupled to said bracket;
 b. a third magnet operatively coupled to said second carriage, wherein a north pole of said third magnet is located in said first direction relative to a south pole of said third magnet; and
 c. a fourth magnet operatively coupled to said second carriage, wherein a south pole of said fourth magnet is located in said first direction relative to a north pole of said second magnet, wherein said second magnetic sensor is located between said third and fourth magnets.

* * * * *